United States Patent
Wendorf et al.

(10) Patent No.: US 7,919,888 B2
(45) Date of Patent: Apr. 5, 2011

(54) LINEAR DRIVE WITH A MOVING, REDUCED-MASS AND LATERALLY GUIDED PASSIVE UNIT

(75) Inventors: Eckhard Wendorf, Zella-Mehlis (DE); Eberhard Meissner, Zella-Mehlis (DE)

(73) Assignee: Ina Drives & Mechatronics GmbH & Co. OHG, Suhl (DE)

( * ) Notice: Subject to any disclaimer, the term of this patent is extended or adjusted under 35 U.S.C. 154(b) by 414 days.

(21) Appl. No.: 12/294,040

(22) PCT Filed: Mar. 20, 2006

(86) PCT No.: PCT/EP2006/060891
§ 371 (c)(1),
(2), (4) Date: Sep. 22, 2008

(87) PCT Pub. No.: WO2007/107183
PCT Pub. Date: Sep. 27, 2007

(65) Prior Publication Data
US 2009/0127941 A1    May 21, 2009

(51) Int. Cl.
*H02K 41/02*    (2006.01)
(52) U.S. Cl. ............... 310/12.31; 310/12.01; 310/12.02; 310/12.09; 310/12.33
(58) Field of Classification Search ............... 310/12.01, 310/12.02, 12.09, 12.31, 12.33
See application file for complete search history.

(56) References Cited

U.S. PATENT DOCUMENTS
4,563,602 A * 1/1986 Nagasaka ................. 310/12.22

FOREIGN PATENT DOCUMENTS
DE     19803952 A1 *  8/1999
DE     19948490 A1 *  5/2001
WO  WO030412445 A1 *  5/2003

* cited by examiner

*Primary Examiner* — Quyen Leung
*Assistant Examiner* — Jose A Gonzalez Quinones
(74) *Attorney, Agent, or Firm* — Stuart H. Mayer; Mayer & Williams PC

(57) ABSTRACT

The invention relates to a linear drive having a stationary active unit (1), a stationary return flow element (11), a movably mounted passive unit in the form of a thin tooth rack (10) and a bearing unit (15), which allows the relative movement between the active unit and the passive unit. A lateral guidance plate (30) is attached to the tooth rack (10), extends at an angle with respect to the plane of the tooth rack (10) into a guide gap (31) and is guided there, the guide map (31) running in the return flow element (11) or in the active unit (1).

12 Claims, 4 Drawing Sheets

- State of the Art -

LINEAR DRIVE WITH A MOVING, REDUCED-MASS AND LATERALLY GUIDED PASSIVE UNIT

Figure 1:
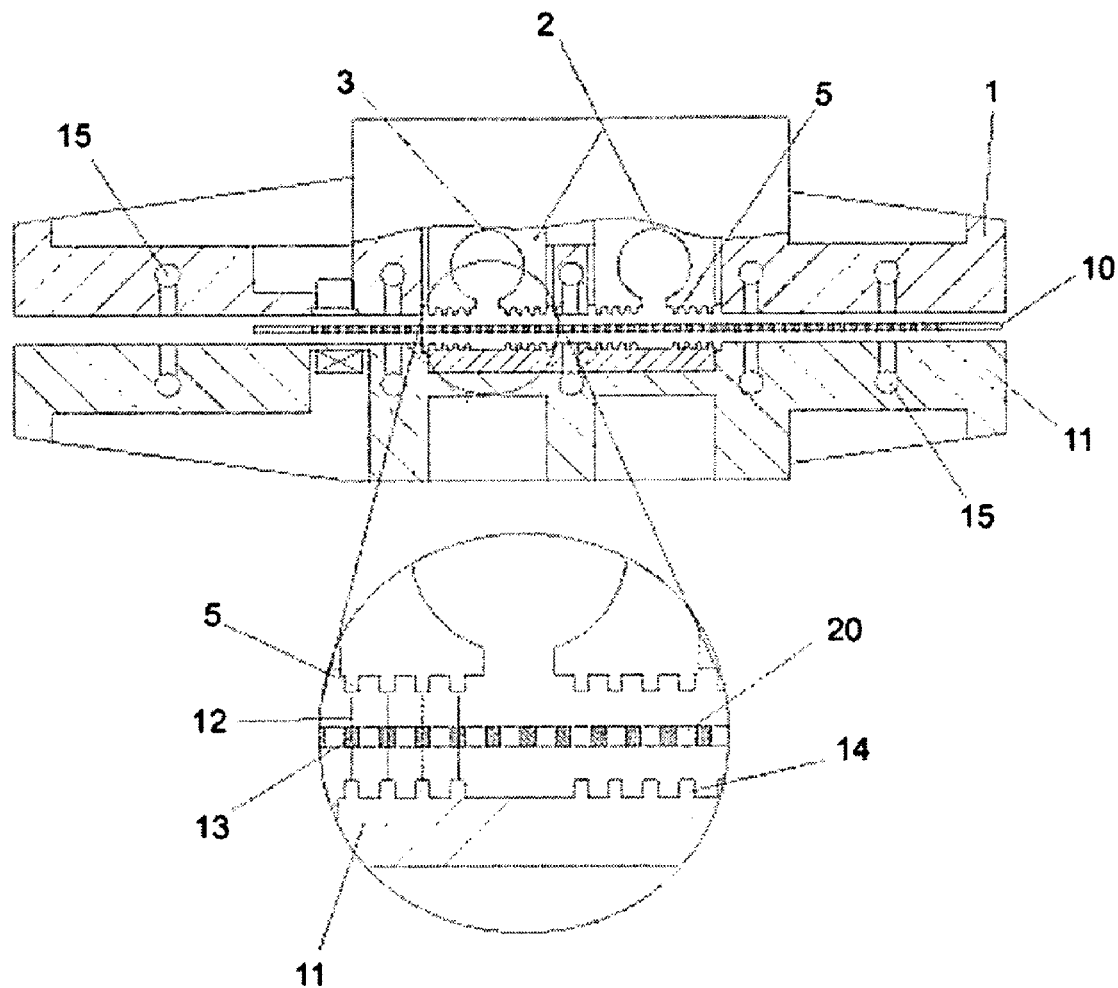

The invention at hand relates to a linear drive with a fixed active unit containing coil bodies to generate an alterable magnet flow; with a passive unit; a bearing unit permitting a low friction movement between the active and passive units; and with a control unit by means of which the magnet flow can be controlled.

Nowadays, linear drives (also called linear motors) that operate in accordance with the electromagnetic principle similar to rotatory motors are utilized in the most varied fields of engineering. One advantage of such linear drives is, among other things, the fact that force-generating as well as framing functions can be integrated in a few structural units. In the case of linear drives, the active unit as well as the passive unit may be the moved element. In order to achieve high speeds and great acceleration with low expenditures of force, it must generally be attempted to reduce the moved mass.

From the German published patent application DE 32 08 380 A 1, a linear drive is known in which permanent magnets and electromagnets are contained in the active unit to generate a controllable magnet flow. The passive unit consists of a soft iron strip equipped with so-called pole teeth. In that printed text, the general principle of function of such linear motors is described in detail so that it may be assumed that experts are familiar with the mode of operation of linear motors. The cited printed text also provides an indication that in general there is the possibility of using the passive unit as the moved element while the active unit forms the stator. However, in these cases, high masses must be moved, allowing only minor accelerations. That is to say that the soft iron strips serving as passive units may not be designed arbitrarily thin since they must provide an adequate cross section of material for the magnetic flow generated by the active unit. Otherwise, the magnetic flow density will drop, with the resulting drive forces therefore being low.

In U.S. Pat. No. 4,563,602 a linear motor is described as well that may be designed as a one-phase synchronous machine as well as a multi-phase synchronous machine. In this context it must be pointed out that it is irrelevant for the invention at hand what number of current phases the active unit is operated with and what specific control and regulation methods are used for an optimization or, respectively, for an increase in precision. From the aforementioned American patent specifications it is also known that the active unit and the passive unit may by coupled via an air suspension. Such air suspensions are frequently utilized in linear drives since they drastically reduce friction losses.

In the magazine "antriebstechnik" [drive engineering] 33 (1994) No. 7, page 68, a precision direct drive is described that employs the functional principle of a permanent magnet activated two-phase reluctance multi-phase motor in hybrid engineering. As far as the structure of the active unit is concerned, the contents of this printed text is incorporated here into this disclosure to avoid any repetitions.

A general representation of the structural design and of the mode of operation of electromagnetic multiphase motors is shown in E. Kallenbach's "Gerätetechnische Antriebe" [device-engineering drives] ISBN 3-446-15872-3, in particular in chapter 2.3.2. In view of the disclosure of the mode of operation of the linear motors involved in this invention, the experts are referred to this source as well.

DE 196 43 518 A 1 shows a linear drive with a moved passive unit which for mass-reducing purposes consists of a light construction base body with a magnetizable soft iron plate attached to it. While a mass reduction of the passive unit may be achieved with this arrangement while simultaneously maintaining sufficient stability of the passive unit, the plate mostly made of soft iron material must still have a minimal thickness in order to provide the required cross section to conduct the magnet flow.

From JP 56 117 572, a linear drive with a movable passive part in the form of a toothed plate has been known. The movable passive part moves within a fixed active unit with two opposed running surfaces that have a circular pitch. The teeth of the active running surfaces are arranged opposite the teeth of the movable passive unit. The magnet circuit generated in each case by the parts of the active unit is closed in the passive element. Therefore, a not insignificant cross section of the passive unit must be made available in dependence of the drive force required in each case.

JP 2000 004 575 contains a linear actuating drive with a linear drive and a rotation drive. Excitation of the inductors of the linear drive leads to a translation motion of the drive shaft. The rotation of the drive shaft is caused by the rotation drive which is located at the end of the shaft below the rotation drive. The drive shaft is freely movable in relation to the rotation drive in an axial direction to the effect that the rotation drive is not moved along in the case of a translation movement.

A linear drive with a moved mass-reduced passive unit is explained in WO 03/041245 A1. For an efficient mass reduction, the passive unit merely consists of a thin toothed plate on which magnetically conductive teeth alternate with magnetically non-conductive teeth. In order to make a sufficiently great magnetic flow possible in spite of that, an active unit with a toothed active running surface is provided on an opposite side of the passive unit while on the other side of the passive unit a reflux element is arranged that provides the yoke for the magnetic flow. The magnetically conductive teeth of the toothed plate are flowed through by the magnetic flow but do not need to provide the yoke cross section for the magnetic flow. The toothed plate is movably supported between the active unit and the fixed reflux element and can be moved at high acceleration rates due to its low mass. In addition, for a precise positioning of the toothed plate, a lateral guidance mechanism is required for which in this printed text lateral guidance magnets are provided that interact with a row of auxiliary teeth arranged laterally on the toothed plate. However, it has turned out that such a lateral guidance mechanism brings several disadvantages with it. On the one hand, the overall size of the entire linear drive increases due to the required space for the lateral guidance magnets and the row of auxiliary teeth. The overall weight of the linear drive rises to the effect that it is hardly suited for use in automatization units. On the other hand, the accuracy during positioning achievable by means of the magnetic lateral guidance is limited. Hysteresis effects occur that reduce the reproducibility. In addition, the magnetically acting lateral guidance is relatively susceptible vis-à-vis torques and transversal forces that may act on the toothed plate.

The objective of the invention at hand is therefore to provide an improved linear drive that, with minimal mass of the passive unit and high generable drive forces, makes an even more reduced overall structural size and a more stable lateral guidance possible than is known from the state of the art.

This objective is met by the linear drive in accordance with claim 1.

An important aspect of the invention at hand is to be seen in the fact that the lateral guidance of the toothed plate functioning as passive unit is achieved with the aid of a lateral guidance plate which is run in the structural space that is required for the reflux element anyway. The lateral guidance plate is fastened at an angle, preferably essentially standing vertically on the toothed plate, and engages in a guiding gap that extends in the reflux element along the entire length of movement.

The guidance gap is preferably arranged centrally in the reflux element while the lateral guidance plate runs in one plane with the symmetry axis of the toothed plate. This makes it possible to achieve symmetric force conditions with regard to the drive forces as well as to the required lateral guidance forces.

In the case of modified embodiments, several guidance gaps running parallel may be provided in the reflux element into which parallel arranged lateral guidance plates engage, each of which is attached to the toothed plate. This may be advantageous in particular when the depth of the guidance gap must be kept low so that only short lateral guidance plates can be inserted.

It is particularly advantageous if the guidance of the lateral guidance plate is formed by a secondary air bearing created in the guiding gap. An uncomplicated overall construction of the linear drive results in particular when the passive element is also supported with the aid of an air bearing between the active unit and the reflux element. However, as a matter of principle, other known bearing designs are usable as well.

In a preferred embodiment, a material measure is attached to or, respectively, integrated into the lateral guidance plate that extends in the direction of motion that serves to determine the position of the passive unit. The appurtenant sensor may be attached to the reflux element or to the frame of the drive. For example, magnetic or optical measuring principles may be used in a manner that is known per se.

To generate the drive force, the magnet flow generated by the active unit runs through the magnetically conductive teeth of the toothed plate in the same manner as in the case of linear motors that are known per se. However, the magnet circuit is not (or at least not completely) closed immediately in the moved part of the passive unit, i.e. in the movably mounted toothed plate. Instead, after running through the individual teeth, the magnetic flow enters the fixed reflux element which in magnetic respect forms the passive unit together with the moved toothed plate. The material cross section effective with regard to the magnetic flow is increased by the fixed reflux element. Therefore, the movably mounted toothed plate may be made very thin, thereby making a drastic mass reduction possible.

In accordance with an advantageous embodiment, the fixed reflux element is formed by a soft-iron block which has a passive running surface which lies parallel across from the active running surface of the active element. The toothed plate moves between these two parallel running surfaces when the magnetic fields generated in the active unit are suitably altered.

In a modified embodiment of the linear drive in accordance with the invention, the passive running surface also has a circular pitch that corresponds to the circular pitch of the active running surface.

Another modified embodiment is characterized by the fact that the fixed reflux element is formed by a second fixed active unit with a second active surface. Thus, there is one active running element on either side of the moved toothed plate which makes it possible to provide great drive forces in spite of the largely reduced mass of the moved toothed plate. Since the second active running surface also provides a magnetically conductive area, there is no interruption of the magnet circuit even though the individual teeth of the toothed plate are not directly connected by magnetically conductive areas.

In an altered embodiment of the linear unit, the single or several lateral guidance plates do not only extend into the reflux element but through it all the way to an opposite toothed plate which on its part forms a passive unit for an opposite active unit. The two toothed plates and the lateral guidance plates running between them have a double-T cross section in this embodiment.

Even if arranging the guiding gap in a passive reflux element turns out to be advantageous due to the less complicated construction, integrating the guiding gap into the fixed active unit may be suitable under certain operational conditions. In another modified embodiment, it is also possible to attach one lateral guidance plate on each of the two running surfaces, which plates are guided in guiding gaps that, on the hand, run in the active unit and, on the other hand, in the reflux element.

With the use of two opposite active units, the individual coil bodies of the active units may be activated independently of each other or be electrically interconnected to the effect that they form one uniform coil body that is activated by the control unit.

It is particularly advantageous if the moved toothed plate consists of a non-magnetically conductive carrier plate in which the magnetically conductive teeth are attached. The required high precision of the positioning of the individual teeth can be achieved in this way. The carrier plate, for example, is made of ceramic, with numerous equally distanced parallel running recesses being provided into which soft iron strips are placed. The magnetically conductive teeth may also be produced through other technologies, e.g. through galvanic processes or other coating methods.

In a modified embodiment, the toothed plate consists of a magnetically conductible carrier plate in which the individual tooth gaps are recessed as clear spaces between the teeth. In order to provide an even surface of the toothed plate, which is advantageous with the use of an air bearing, the tooth gaps are filled with a magnetically non-conductive material (e.g. synthetic resin) and subsequently ground smooth.

To the extent that the demands on mass reduction of the moved toothed plate are not too great, the moved tooth plate may also have a reflux segment that connects the individual teeth of the toothed plate in conductive fashion. This reflux segment may be formed, for example, by a soft iron foil that is arranged on the side of the toothed plate facing the fixed reflux element. In this case the fixed reflux element and the reflux segment being moved together with it jointly provide the desired cross section to conduct the magnetic flow-through.

The shape and size of the tooted plate can be adapted to each case of application. In this context it is particularly advantageous if attachment segments are provided on the toothed plate that protrude laterally beyond the active unit and/or the reflux elements so that a carrying unit, for example a tool carrier, may be attached to it. Such attachment segments may be arranges alternately or simultaneously on the lateral guidance plate as well to the effect that they protrude from the guiding gap on the side opposite the toothed plate and can again be used as attaching points for a carrier unit.

In a particularly preferred embodiment, a rotatory actor or miniature motor is attached to the carrier unit. The rotational axis of the miniature motor may lie in one plane with the moved passive unit so that a rotational movement around one rotation axis may be realized at the end of the carrier unit that lies parallel to the motion axis of the passive unit.

Particularly advantageous are toothed plates having a thickness of between 0.4 mm to 5 mm. An optimal design is achieved if the thickness of the individual teeth of the toothed plate and thus the thickness of the toothed plate is approximately equal to the width of those teeth. In relevant tests, toothed plates could be utilized successfully that had a total weight of only 10 g. Forces of up to 15 N were realized with such toothed plates whereby an outstanding force/mass ratio is achieved.

As mentioned above, air bearings are particularly well suited as bearing unit for the linear drive in accordance with the invention. The air nozzles required therefor may be attached to the active unit and in the reflux element so that the toothed plate is guided on an air cushion on both sides. The linear drive in accordance with the invention can of course be realized with other guiding and bearing elements, for example if the toothed plate is mounted in a coil rail or in a dovetail guiding mechanism.

Figure 2:
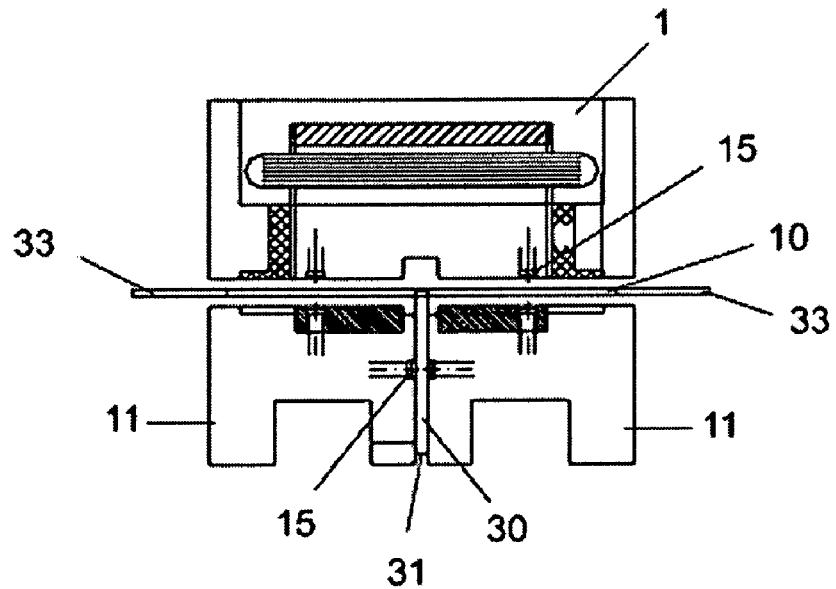
Figure 3:
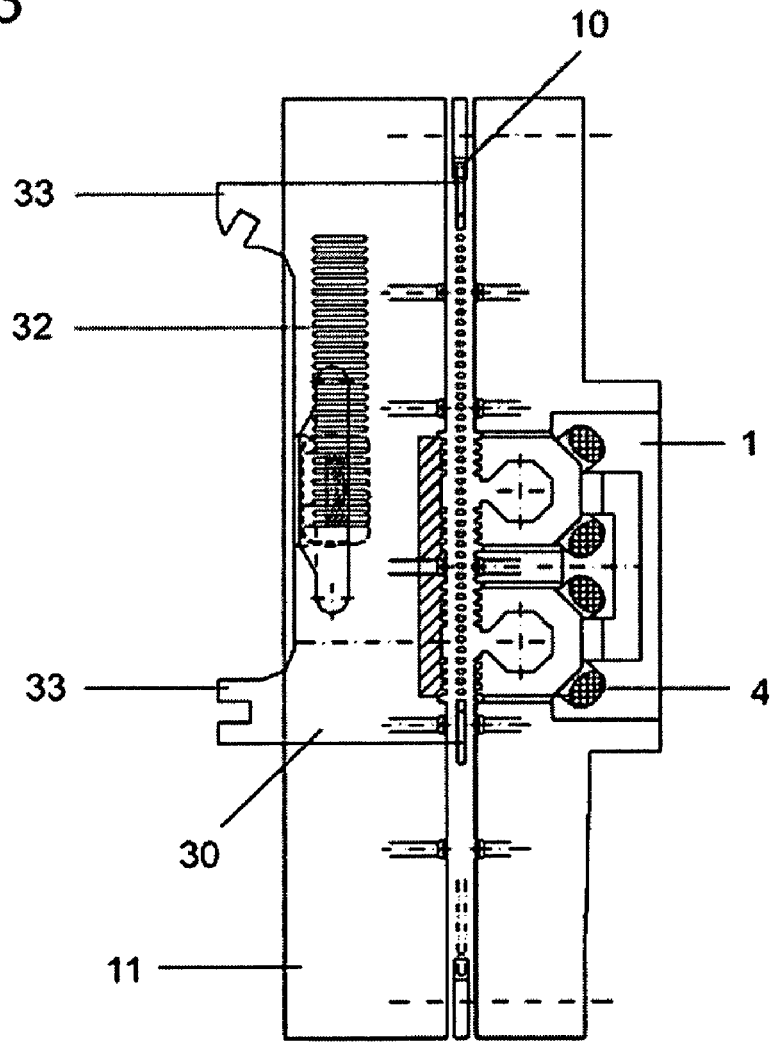
Figure 4:
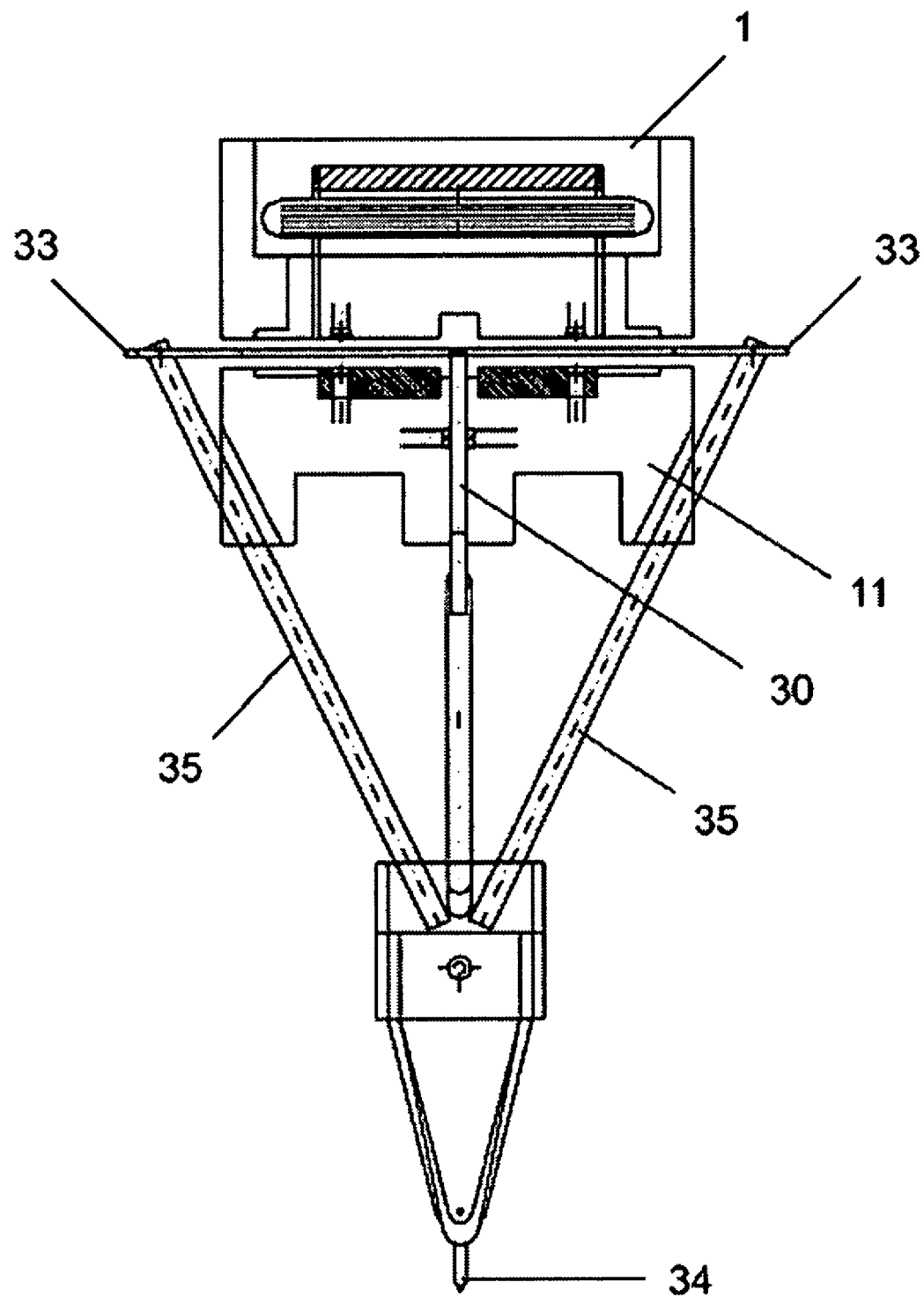
Figure 5:
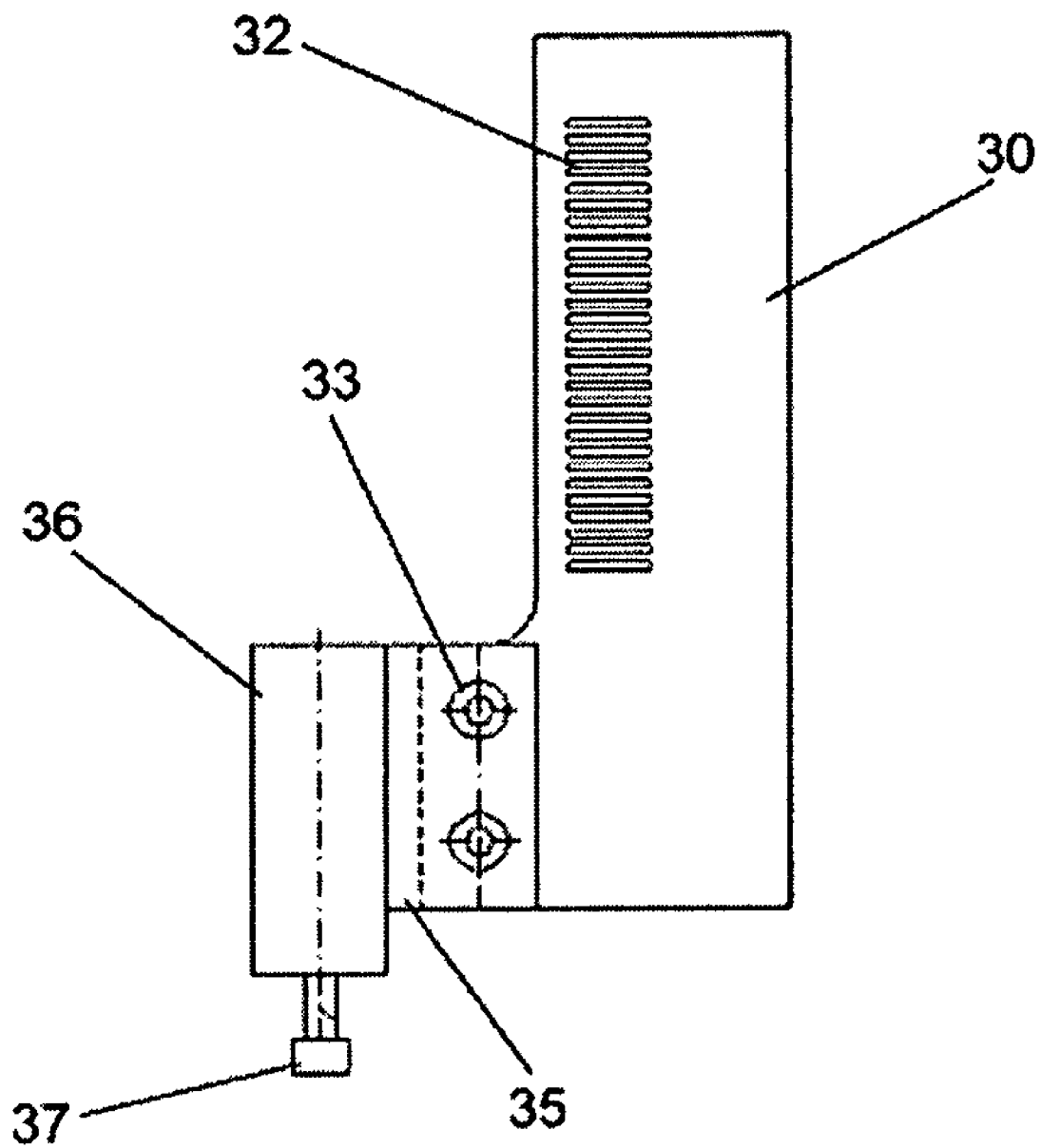

Additional advantages and continued developments will result from the following description of preferred embodiments of the invention, with references being made to the drawing. Shown are in:

FIG. 1 a partially cut lateral view of a state of the art linear drive, with an enlarged detailed representation;

FIG. 2 a simplified cross sectional view of an initial embodiment of a linear drive in accordance with the invention;

FIG. 3 a simplified view of a longitudinal cut of a linear drive from FIG. 2;

FIG. 4 a simplified view of a longitudinal cut of an embodiment with a sensor tip;

FIG. 5 a simplified lateral view of a lateral guiding plate with a miniature motor attached to the latter.

FIG. 1 shows a partially cut lateral view of a linear drive as it is known from the above-cited WO 03/041245 A1. Since important elements of the linear drive in accordance with the invention conform to this known drive, the description of the principle of the operating mode will be brief. The linear drive has an active unit 1 which contains several coil bodies 2. The coil bodies 2 consist of packetized soft iron cores that are provided with an electrical coil 4 (see FIG. 3) to generate an alterable magnetic field. The electrical coils are activated by a control unit (not shown) in order to design the resulting magnetic flow in such a way that drive forces will be generated. With regard to the mode of operation of such a linear drive, reference is made to the state of the art indicated in the introduction to the description.

The coil bodies have an active running surface 5 on their side turned outward which in turn has a circular pitch that is flowed through by the magnetic flow. The circular pitch consists of teeth and tooth gaps, with the tooth gaps usually being filled with a magnetically non-conductive material in order to create an even active running surface 5.

In the embodiment shown, the linear drive furthermore has a thin movably mounted toothed plate 10 and a fixed reflux element 11. The toothed plate 10 and the passive reflux element 11 together form the passive element of the linear drive relative to the magnetic flow. The course of the generated magnetic flow is shown in the detailed enlargement contained in FIG. 1 by single lines 12. The magnetic flow originates from the teeth of the active running surface 5, penetrates the magnetically conductive teeth 13 of the toothed plate 10 and then enters the reflux element 11 made of a soft iron material which closes the magnetic circuit. In order to reduce any eddying currents in the reflux element 11, it may be made as a sheet metal construction (composed of individual metal sheets) in a manner that is known per se.

In the embodiment shown in FIG. 1, the reflux element 11 has teeth as well that form a passive running surface 14. In other embodiments, the passive running surface 14 may also be designed as a plane surface since the circular pitch necessary for the generation of the drive forces is mandatory only in the toothed plate 10.

The toothed plate 10 is therefore movably mounted between the active unit 1 and the reflux element 11, with the mounting being formed by several air nozzles 15 that provide an air bearing for the toothed plate 10.

Depending on the actuating method chosen, the electrical coiling 4 may course through two soft iron cores lying next to each other or it can in each case be attached to an independent soft iron core 3. The coiling technique mentioned first is shown, for example, in the state of the art mentioned in the introduction of the description. In modified embodiments, it would also be possible to connect the coiling 4 with a partial coiling that is attached to an additional coil body located in a second active unit (not shown). In this case, this second active unit replaces the reflux element 11 and is positioned on the other side of the toothed plate 10.

Likewise, it would be possible to magnetically connect the coil body of the active unit with the reflux element or, respectively, a section thereof, via an iron yoke. The magnetic circuit would continue to run through the teeth of the toothed plate as desired. However, with this arrangement it would be possible to generate greater drive forces per area of the toothed plate, if necessary.

The toothed plate 10 consists, for example, of a carrier plate 20 which has a multitude of recesses in which the individual teeth 13 are arranged. In this case, the carrier plate 20 is made of a magnetically non-conductive material, for example ceramic. But it would also be possible to make the toothed plate 10 of a soft iron material, with the individual teeth 13 being magnetically connected with each other on the side turned away from the active unit 1 by means of a thin plate or, respectively, foil that forms a reflux segment. This reflux segment would then interact with the reflux element 11, with regard to which the teeth on the passive running surface 14 can be dispensed with.

FIG. 2 shows a simplified cross sectional view of a linear drive in accordance with the invention. To the extent that elements with the same function as in the drive shown in FIG. 1 are used, they were identified with the same reference numbers. A decisive peculiarity of the invention can be seen in the fact that attached to the moving toothed plate, there is a lateral guiding plate that is essentially vertical to the toothed plate. The lateral guiding plate 30 runs in a guiding gap 31 which in the embodiment shown is positioned in the symmetry plane of the reflux element 11. The lateral guiding plate 30 is preferably made of the same material as the toothed plate 10, e.g. ceramic, whereby different thermally caused expansions are avoided.

For a technological simplification, the reflux element 11 may be made consisting of two parts, with the two parts being distanced from each other during the assembly in such a way that the guiding gap 31 remains between them.

The guidance of the lateral guiding plate 30 in the guiding gap 31 simultaneously effects the lateral guidance (relative to the motion direction) of the moving toothed plate 10 due to the fixed connection between the lateral guiding plate 30 and the toothed plate 10 which may be achieved, for example, by means of welding or gluing.

In the embodiment shown in FIG. 2, the guidance in the guiding gap 31 is formed by a secondary air bearing which in turn is produced by air nozzles 15. The lateral guiding plate 30 preferably has essentially the same length as the toothed plate 10. The width of the lateral guiding plate 30 may also be generous since sufficient structural space is available in the depth of the reflux element. Thus, there is a large guiding surface available to provide the lateral guidance of the toothed plate 10, to the effect that the accuracy of the motion of the toothed plate 10 becomes very independent of the laterally effective forces and momentums.

FIG. 3 shows a simplified view of a longitudinal cut of the linear drive shown in FIG. 2. This view clearly shows that the lateral guiding plate 30 extends essentially across the entire depth of the reflux element 11. In the embodiment shown, the lateral guiding plate 30 furthermore carries a material measure 32 that can be evaluated for a precise ascertainment of the position of the moving passive unit. In addition, two attachment segments 33 are formed on the lateral guiding plate 30 that protrude from the reflux element 11 during the motion. Similar attachment segments 33 can also be found on the toothed plate 10 (see FIG. 2), with these attachment segments protruding laterally beyond the reflux element and remaining accessible during the motion as well.

FIG. 4 shows a cross sectional view of a modified embodiment of the linear drive. In this case, the linear drive serves the movement and positioning of a sensor needle 34 that is attached to the attachment segments 33 via a carrier unit 35. Other tools may be attached to the carrier unit 35 in lieu of the sensor needle 34. The positioning of work pieces is also possible with the linear unit.

In order to maintain the advantages of the linear unit which, among other things, result from the low weight of the moving passive unit, the carrier unit 35 should be constructed as light and stiff as possible. For example, struts made of ceramic, light metal or carbon fiber may be attached to the attachment segments 33.

FIG. 5 shows a modified embodiment of the lateral guidance plate 30 of the linear drive in a detailed view. A miniature motor 36 is attached to the attachment segment 33 of the lateral guiding plate 30 by means of the carrier unit 35 in lieu of the sensor needle. The miniature motor 36 is therefore moved along during a translatory movement caused by the linear drive. A hook 37 may be arranged for example on the miniature motor 36 which is therefore linearly displaceable and rotatable around the rotation axis of the miniature motor. Many positioning tasks can be solved by means of such a hook, in particular so-called Z-Ψ movements. To this end, the linear drive in accordance with the invention may be attached to a carrying arm moving in the X-Y plane, as is known, for example, from automats for the equipment of printed circuit boards. Great accuracies as well as high speeds and accelerations can be achieved with it.

LIST OF REFERENCE SYMBOLS 1 active unit
2 coil body
3 soft iron core
4 electrical coiling
5 active running surface
10 toothed plate
11 reflux element
12 magnetic flow
13 teeth of the toothed plate
14 passive running surface
15 air nozzles
20 carrier plate
30 lateral guiding plate
31 guiding gap
32 material measure
33 attachment segments
34 sensor needle
35 carrier unit
36 miniature motor
37 hook

The invention claimed is:

1. Linear drive with
   a fixed active unit with coil bodies for the generation of a controllable magnetic flow and an active running surface which has a circular pitch flowed through by the magnetic flow;
   a fixed reflux element;
   a passive unit that is designed in the form of a toothed plate and mounted movably between the active running surface and the reflux element and comprising the magnetically conductive and magnetically non-conductive tooth gaps in a manner corresponding to the circular pitch of the active running surface and its alignment, with the toothed plate having a thickness of 0.4 mm to 5 mm or a thickness essentially equal to the width of the teeth; and
   a bearing unit that permits the relative motion between the active and passive units; characterized by the fact that a lateral guiding plate is attached to the toothed plate that extends at an angle to the plane of the toothed plate and into a guiding gap where it is guided, with the guiding gap running in the reflux element or in the active unit.

2. The linear drive of claim 1, wherein the lateral guiding plate runs essentially vertically to the toothed plate and wherein the guidance of the lateral guiding plate is formed by a secondary air bearing built up in the guiding gap.

3. The linear drive of claim 1, wherein the lateral guiding plate carries a material measure extending in the direction of motion which is scanned to determine the position of the passive unit by a sensor located on the reflux element.

4. The linear drive of claim 1, wherein the toothed plate comprises a magnetically non-conductive carrier plate with a multitude of equally spaced parallel running recesses into which the conductive teeth have been placed, and wherein the thickness of the toothed plate is essentially equal to the width of the individual teeth.

5. The linear drive of claim 1, wherein the bearing unit for the toothed plate is formed by an air bearing.

6. The linear drive of claim 1, wherein the toothed plate and/or the lateral guiding plate have attachment segments that protrude beyond the space occupied by the reflux element.

7. The linear drive of claim 6, wherein a carrier unit is attached to the attachment segments.

8. The linear drive of claim 7, wherein an actor or miniature motor is attached to the carrier unit which makes the rotation of a tool around a rotational axis possible.

9. The linear drive of claim 1, wherein the reflux element is formed by a second fixed active unit which has a second active running surface with a circular pitch flowed through by the magnetic flow and with coil bodies to generate a controllable magnet flow.

10. The linear drive of claim 1, wherein the carrier plate and the lateral guiding plate are made of a magnetically non-conductive material, in particular ceramic, plastic or glass.

11. The linear drive of claim 1, wherein the lateral guiding plate essentially extends across the entire length of the toothed plate in the direction of motion.

12. The linear drive of claim 1, wherein the lateral guiding plate extends between two opposite toothed plates, with each of the opposite toothed plates being allocated to two opposing active units.

* * * * *